United States Patent [19]
Aimar

[11] 4,095,765
[45] Jun. 20, 1978

[54] ADJUSTABLE CABLE CLAMP
[75] Inventor: Michele Aimar, Turin, Italy
[73] Assignee: ITW Fastex Italia, S.p.A., Turin, Italy
[21] Appl. No.: 781,606
[22] Filed: Mar. 28, 1977
[30] Foreign Application Priority Data
  Apr. 14, 1976  Italy ................. 22289 A/76
[51] Int. Cl.² ............................... H01R 13/58
[52] U.S. Cl. ................. 248/56; 174/153 G; 339/103 B
[58] Field of Search .......... 248/56; 174/65 G, 152 G, 174/153 G; 339/103 B, 126 RS; 16/2

[56] References Cited
U.S. PATENT DOCUMENTS

| | | | |
|---|---|---|---|
| 684,909 | 10/1901 | Cole ................. | 174/153 G |
| 3,493,205 | 2/1970 | Bromberg ............ | 248/56 |
| 3,562,847 | 2/1971 | Jemison ............. | 248/56 X |
| 3,889,909 | 6/1975 | Koscik .............. | 248/56 |
| 4,000,875 | 1/1977 | Jemison et al. ...... | 248/56 |

FOREIGN PATENT DOCUMENTS

| | | | |
|---|---|---|---|
| 2,502,050 | 7/1976 | Germany ............ | 174/153 G |
| 2,316,747 | 10/1974 | Germany ............ | 174/153 G |
| 2,132,758 | 1/1973 | Germany ............ | 174/153 G |

Primary Examiner—Roy D. Frazier
Assistant Examiner—Rodney H. Bonck
Attorney, Agent, or Firm—Jack R. Halvorsen; Robert W. Beart

[57] ABSTRACT

A plastic strain relief clamp is provided which comprises a head and a body having a through bore for receiving a cable, a pawl integrally formed with the body and flexibly connected thereto adjacent the bore and a second bore for a self-tapping screw adapted to be brought in engagement with the pawl in order to engage the pawl with the cable.

6 Claims, 4 Drawing Figures

ADJUSTABLE CABLE CLAMP

This invention relates generally to cable clamps and particularly to a strain relief cable clamp used on electrical household appliances.

It is known that there are regulations for the feeding cables of apparatus, particularly electrical appliances, which differ from one country to another. These regulations relate mainly to the minimum cable diameter for a given power rating of the installed apparatus. Accordingly, for each cable diameter the corresponding strain relief wire clamp should be provided, which requires the provision of a complete series of different cable clamps in order to meet the various requirements.

The present invention aims to provide an adjustable strain relief cable clamp which can suit the different requirements and which nevertheless is inexpensive to manufacture and easy to install.

More particularly the cable clamp according to the invention is of plastic material and is characterized in that it is provided with a head and a body having a through bore which is intended to receive the cable, a pawl integrally moulded with said body and flexibly connected thereto and a second bore for a self-tapping screw adapted to be brought in contact with a flange on said pawl in order to engage the latter with the cable.

The invention will be better understood from the following description, given by way of example only and therefore not intended in a limiting sense, of an embodiment thereof in connection with the accompanying drawings in which.

Figure 1:
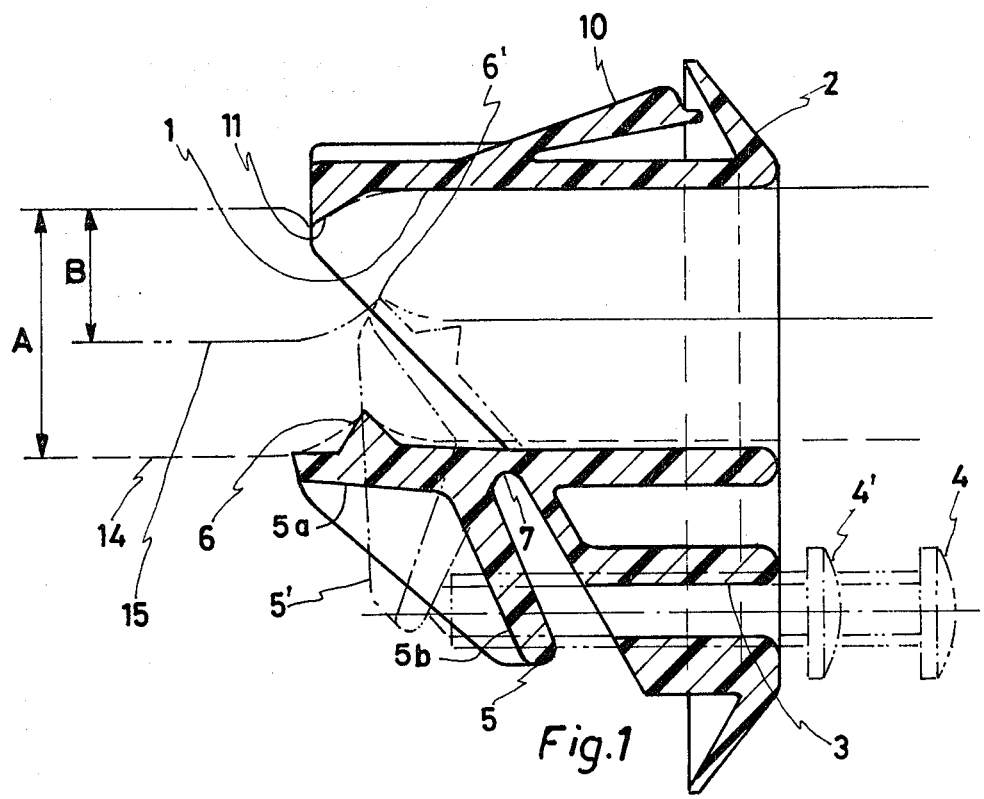
FIG. 1 is an axial sectional view of a strain relief cable clamp according to the invention.
Figure 2:
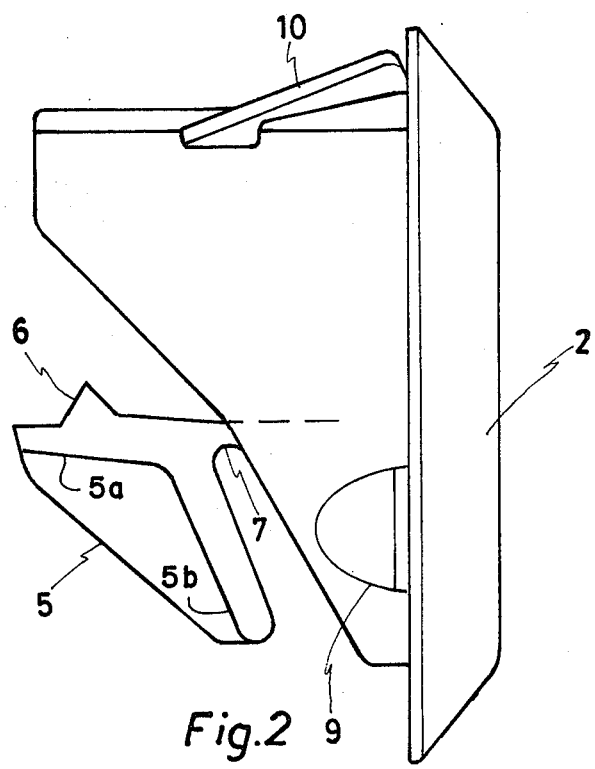
FIG. 2 is a side elevation view of the cable clamp of FIG. 1.
Figure 3:
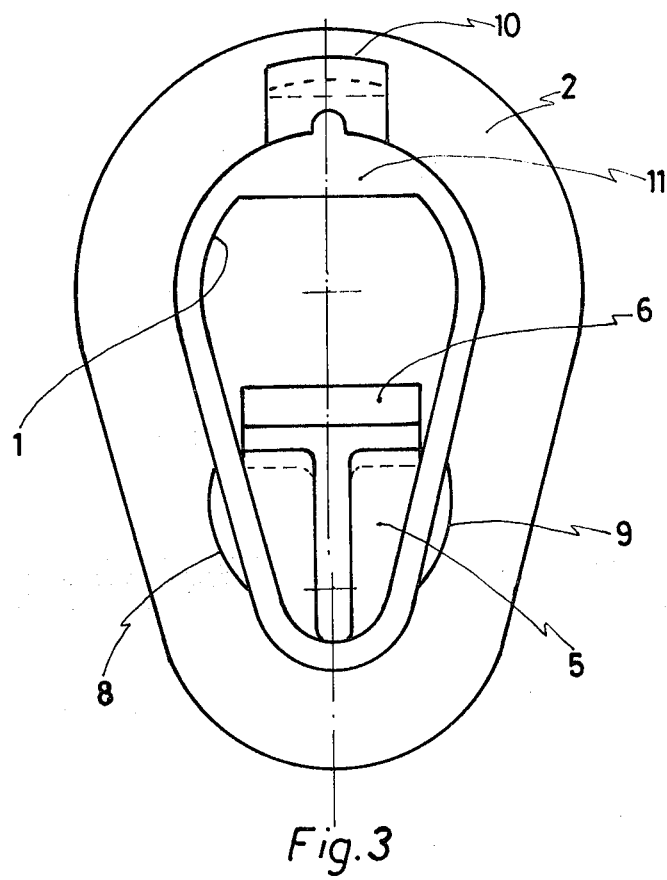
FIG. 3 is an end view of the cable clamp of FIGS. 1 and 2.

Referring to FIGS. 1 to 3, the cable clamp strain relief type of is shown as a single piece of plastic material, generally oval in shape and comprises substantially a body 1 having a through bore for receiving a cable, a head flange 2 and a second bore 3 parallel to the through bore for receiving a self-tapping screw 4, shown in dotted line in two different positions, one of which is designated with 4'. An L-shaped pawl 5 having one limb 5a of pawl 5 is initially positioned as a continuation of a wall defining the through bore in body 1 and carries a tooth 6 said first limb 5a is integrally connected through a thinned hinge portion 7 to the body 1 of the clamp. The second limb 5b of "L"-shaped pawl 5 extends angularly outwardly from the first limb 5a and intersects with the axis of the second bore 3.

In the lower portion of the clamp body two protuberances 8 and 9 are provided, each projecting from one side of the clamp side walls. Projecting from the top wall of the cable clamp is a flexible lug 10. On the portion opposite that having the flange 2 the clamp is provided with a tooth 11 which projects downwardly into the through bore in body 1. Tooth 11 is positioned opposite to tooth 6 carried by pawl 5.

Figure 4:
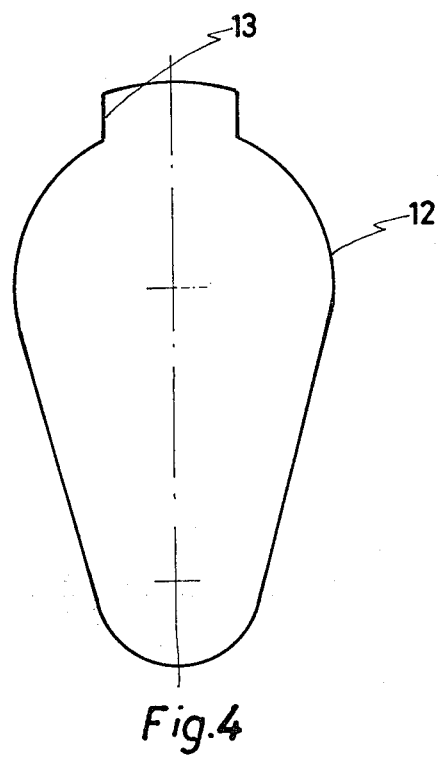
FIG. 4 is a view of the aperture provided in the panel wall for receiving the cable clamp.

In order to secure the described cable clamp to the wall of an apparatus it is necessary to provide in said wall an oval-shaped bore, such as the aperture designated by numeral 12 in FIG. 4. This aperture 12 preferably has a recess 13 in the upper portion thereof.

Since the protuberances 8 and 9 on the opposite sides of the clamp are not yieldable in nature, the clamp must be fitted into the aperture 12 in a slanted relation and somewhat raised with respect to the position that it will finally take so that the protuberances are permitted to freely pass into the larger position of the aperture. Once the protuberances lie beyond the wall in which the aperture 12 is provided, and an axial pushing force is exerted on the clamp the taper of the aperture 12 will cause the clamp to be slid downwardly along the wall of aperture and to be straightened until it reaches the position wherein the flange 2 is applied to a side of the wall and the flexible lug 10 together with the protuberances 8 and 9 are located on the other side of the wall, the flexible lug being compressed and contributing by means of the elastic reaction force thereof to keep the clamp fixed in the aperture.

The self-tapping screw 4 will be preferably inserted into the second bore 3 before the clamp is fixed to the wall. This screw is inserted into the second bore 3 by turning it so as to cut threads on the bore wall during the screwing operation. Preferably, this second bore will have a polygonal or square cross section in order to permit the chips formed during the self-tapping operation to flow out the bore.

Assuming that a cable 14 having a diameter A is to be clamped by the clamp according to the invention, the screw 4, after the cable has been inserted into the through bore of body 1, is screwed until it is in contact with the second limb 5b of pawl 5 and the screwing operation is carried out until the pawl tooth 6 engages the cable 14 thereby locking the latter between the tooth 6 and the tooth 11 provided in the through bore of body 1.

Even though in an initial rest position the pawl 5 carrying tooth 6 impinges on the outer cylindrical surface large of cable 14, the cable 14 can be passed through the clamp because, as already said, the pawl 5 is flexibly connected to the clamp body and will be deflected.

If, alternatively, the cable to be locked would have a smaller diameter, for example the diameter B designated 15 in FIG. 1, it will be sufficient to tighten the screw 5 until the position designed 4' in FIG. 1, wherein the cable is clamped between an edge of the pawl designated 6' and the tooth 11. By tightening more or less the screw 4 a position for all the intermediate diameters of cable will be found where either the tooth 6 or another sharp portion of the pawl 5 will engage the cable, thereby locking it by means of the tooth 11.

The provision of the screw 4, in addition to permit the clamp to be adjusted with respect to cables having different diameters, meets also the regulations of the countries requiring a screw as an essential equipment of a cable clamp.

While a single embodiment of the invention has been described and shown, it is obvious that various changes and modifications can be made without departing from the scope of the invention.

What I claim is:

1. A plastic adjustable strain relief clamp for retaining cables of differing diameters against axial movement relative to an irregular apertured workpiece, said clamp including a head adapted to cover said aperture and a body complementary to said irregular aperture and having an axially extending through bore capable of accepting cables of differing diameters, a second bore extending through said body parallel to said first bore and opening through said head, an integral generally L-shaped pawl having a first limb hingedly connected to said body and generally defining an extension of one end wall of said through bore, said pawl further including a second limb angularly disposed relative to said first limb and being so disposed that it intersects the axis of said second bore, screw means acceptable within said second bore to impinge upon the second limb of said pawl to cause said pawl to pivot about said hinge means and to bring the first limb of said pawl into locking engagement with the cable.

2. A plastic clamp according to claim 1 characterized in that said first limb carries an integral tooth-like protuberance for gripping said cable.

3. A plastic clamp according to claim 2, characterized in that said body on the opposite end with respect to the head is provided with a clamping tooth extending into said through bore and intended to cooperate with said pawl for locking the cable between said clamping tooth and the tooth-like protuberance on said pawl.

4. A plastic clamp according to claim 1, characterized in that said body has a substantially tapered oval shape so as to fit in an aperture of corresponding shape provided in a wall of the apparatus to which the cable is to be fastened.

5. A plastic clamp according to claim 4, characterized in that the side wall of the clamp body has a rigid shouldered protuberance on each side.

6. A plastic clamp according to claim 5, characterized in that a flexible lug extends from the top wall of the clamp, said lug facing the head.

* * * * *